United States Patent [19]

Leach et al.

[11] 4,336,077
[45] Jun. 22, 1982

[54] METHOD OF CRYOGENICALLY HARDENING AN INSERT IN AN ARTICLE

[75] Inventors: J. Michael Leach, Washington; Walter L. Harvey, Chillicothe, both of Ill.

[73] Assignee: Caterpillar Tractor Co., Peoria, Ill.

[21] Appl. No.: 189,957

[22] PCT Filed: Mar. 3, 1980

[86] PCT No.: PCT/US80/00227

§ 371 Date: Mar. 3, 1980

§ 102(e) Date: Mar. 3, 1980

[87] PCT Pub. No.: WO81/02586

PCT Pub. Date: Sep. 17, 1981

[51] Int. Cl.³ .................. C21D 6/04; C21D 1/18; F16J 1/04
[52] U.S. Cl. .................. 148/3; 148/125; 148/127; 92/222; 29/156.5 R
[58] Field of Search .................. 148/3, 125, 127, 128, 148/129, 143; 92/222-229; 29/156.5 R, 447; 62/62-65; 428/614; 264/348; 403/273

[56] References Cited

U.S. PATENT DOCUMENTS

| 2,647,847 | 8/1953 | Black et al. | 148/4 |
| 3,098,662 | 7/1963 | Iversen | 285/18 |
| 3,508,531 | 4/1970 | Squinto et al. | 123/193 |
| 3,891,477 | 6/1975 | Lance et al. | 148/125 |
| 4,179,313 | 12/1979 | Koch et al. | 148/3 |

Primary Examiner—L. Dewayne Rutledge
Assistant Examiner—Christopher W. Brody
Attorney, Agent, or Firm—Charles E. Lanchantin, Jr.

[57] ABSTRACT

A method of cryogenically hardening and expanding an insert in an article is disclosed. Particularly, gray iron piston ring insert (14) having an austenitic matrix is treated in a piston body (12) by impinging a cryogenic medium thereon. This changes the matrix microstructure of the insert to at least about 25 Vol. % martensite and desirably increases the hardness level thereof to at least about 95 on the Rockwell "B" scale in the desired regions thereof. The volume of the insert is also expanded to be more securely received in the piston body.

16 Claims, 3 Drawing Figures

METHOD OF CRYOGENICALLY HARDENING AN INSERT IN AN ARTICLE

TECHNICAL FIELD

This invention relates generally to cryogenically treating at least a portion of an insert in an article, and has particular applicability to physically modifying a piston ring insert in a piston.

BACKGROUND ART

Because of the physical characteristics of aluminum pistons it has been the practice to manufacture pistons with built-in cast iron inserts. These annular inserts are provided with one or more peripheral grooves of precise cross sectional configuration for receiving a corresponding number of cast iron piston rings. During the manufacturing process molten aluminum material is poured around the inserts, and in order to obtain the desired degree of bond therebetween as the aluminum and insert materials cool down through a temperature range of about 770° C. (1380° F.) the insert material has been heretofore limited to austenitic gray cast iron. This choice is directly due to the fact that an austenitic microstructure exhibits a coefficient of thermal expansion rate more directly approaching that of the aluminum alloy material of the piston and, hence, a better bond is theoretically possible.

However, in order to extend the service life of engines the piston rings have been made harder. This has desirably resulted in a reduced rate of piston ring wear, but has undesirably resulted in an increased rate of wear and/or deformation of the insert grooves.

Thus, what is desired is an economical method of improving the hardness level of such an insert for improved service life, while still providing a highly effective bond between the material of the piston and the material of the insert during both the manufacturing stages and the dynamic operating conditions experienced in an internal combustion engine.

The present invention is directed to overcoming one or more of the problems as set forth above.

DISCLOSURE OF THE INVENTION

In accordance with one aspect of the present invention a method of hardening an insert is provided including arranging an article and an insert in intimate association, and cryogenically hardening and expanding at least a portion of the insert more tightly into engagement with the article.

In accordance with another aspect of the present invention a method of hardening a piston ring insert in a piston is provided including casting a material around the insert and providing an assembly of the piston and insert, and thereafter cryogenically hardening and expanding the insert more tightly into engagement with the piston.

In accordance with a further aspect of the present invention a method of hardening a ferrous metal piston ring insert in an aluminum piston is provided including cryogenically hardening and expanding the insert more tightly into engagement with the piston by modifying the morphology of the insert from a basically austenitic matrix to at least about 25 Vol.% martensite.

In accordance with a still further aspect of the invention a piston assembly is provided including an aluminum alloy piston and a gray cast iron insert having at least about 25 Vol.% martensite.

Advantageously, a piston assembly has been produced by spraying an austenitic gray cast iron insert with liquified nitrogen and modifying an appreciable portion thereof to martensite. This has resulted in an insert hardness increase from about 77 on the Rockwell "B" scale to about 104 on the Rockwell "B" scale, and a transformation of the material of the insert from a substantially complete austenitic matrix to a matrix of 60 Vol.% martensite.

BEST MODE FOR CARRYING OUT THE INVENTION

Figure 1:
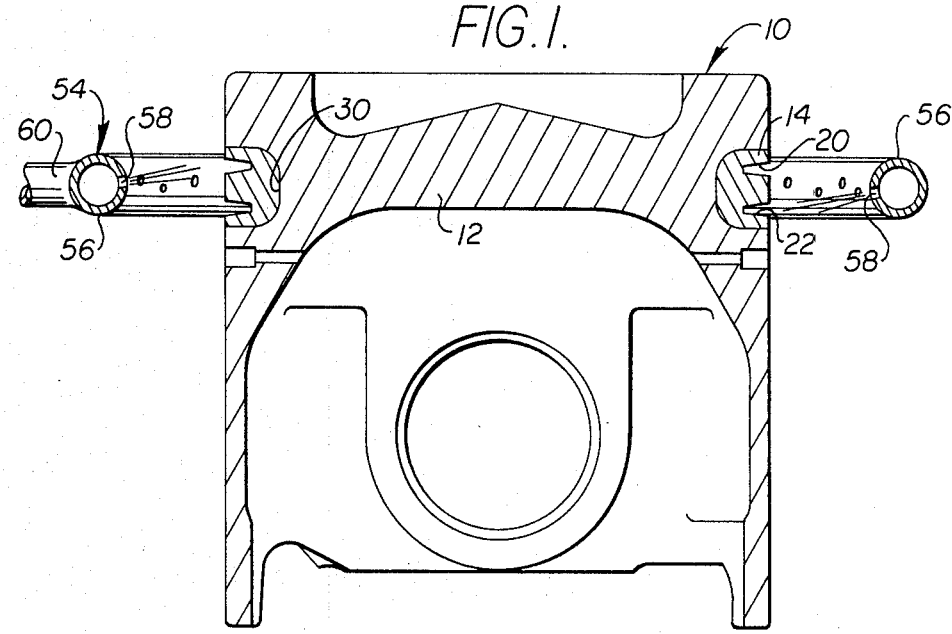
FIG. 1 is a diagrammatic, mid-sectional elevational view of a piston assembly including an apparatus for cryogenically treating the piston ring insert of the piston assembly in accordance with one aspect of the present invention.
Figure 3:
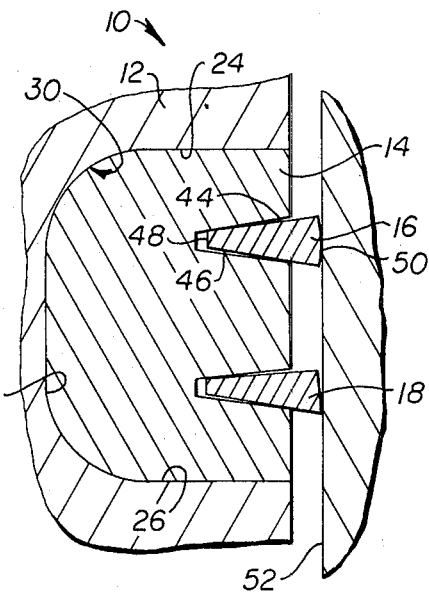
FIG. 3 is a view similar to FIG. 2 showing the piston assembly including a pair of piston rings in the insert in mating operational engagement with a cylinder wall of an internal combustion engine.

Referring to FIGS. 1 and 3, a piston assembly 10 is illustrated having a piston or piston body 12, a piston ring insert 14, and first and second piston rings 16 and 18 disposed in first and second peripheral grooves 20 and 22 formed in the insert.

The piston 12 is preferably made of an aluminum alloy casting material having a relatively high hardness, good wear resistance, good thermal conductivity and maximum fatigue strength at operating temperature. One such aluminum alloy material, having a coefficient of thermal expansion of about $22.0 \times 10^{-6}$ per °C., has the following composition of elements in percentage by weight:

| | |
|---|---|
| Cu | 3.5–4.5% |
| Ni | 1.7–2.3% |
| Mg | 1.2–1.8% |
| Fe | 1.0% Max. |
| Si | 0.7% Max. |
| Mn | 0.35% Max. |
| Zn | 0.35% Max. |
| Cr | 0.25% Max. |
| Ti | 0.25% Max. |
| Other elements | 0.05% Max. |
| Al | remainder |

In essence, the piston 12 has top, bottom and back peripheral surfaces 24, 26 and 28 respectively defining a circumferential recess 30 in which the piston ring insert 14 is received. Proper bonding of the insert along these boundary surfaces is extremely important to the successful operation of the piston assembly 10.

The austenitic piston ring insert 14 is preferably made of gray cast iron material, having a coefficient of thermal expansion of about $19.3 \times 10^{-6}$ per °C. and it is to be noted that this coefficient advantageously approaches that of aluminum. In contrast, other gray iron materials have coefficients of thermal expansion in the range of about 11 to $16 \times 10^{-6}$ per °C. The material piston of the ring insert 14 preferably has the following approximate element composition in percentage by weight:

| | |
|---|---|
| C | 3.00% Max. |
| Ni | 13.50–17.50% |
| Cu | 5.50–7.50% |
| Cr | 1.75–2.50% |
| Si | 1.00–2.80% |
| Mn | 1.00–1.50% |
| P | 0.25% Max. |
| S | 0.12% Max. |
| Fe | remainder |

The annular piston ring insert 14 has top, bottom and back surfaces 32,34 and 36 which mate with the peripheral boundary surfaces 24,26 and 28 respectively of the piston recess 30. Each of the piston ring grooves 20 and 22 is similar. Particularly, each final machined groove has a planar top side 38, a planar bottom side 40 and a cylindrical back side 42.

Turning next to the piston rings 16 and 18, they are preferably made of heat treated ductile cast iron having a hardness of about 40 to 46 on the Rockwell C scale. They are similar in construction. For example, each ring has a planar top surface 44 and a planar bottom surface 46 which surfaces may or may not diverge radially outwardly in much the same way as the adjacent sides 38 and 40 of the grooves 20,22. A back surface 48 of each ring is disposed radially away from the back side 42 of the respective groove. In use, a contoured peripheral wear surface 50 of each ring contacts a cylinder bore 52 of the internal combustion engine and serves to block the escape of combustion gases downwardly when viewing FIG. 3 and to restrict the flow of lubricant upwardly past the piston assembly 10 during reciprocation thereof.

Before and immediately after casting of the aluminum alloy material piston 12 around the insert 14 as shown in FIG. 1, the morphology of the gray iron insert matrix is substantially completely austenitic. In accordance with one aspect of the invention, however, a treating apparatus 54 is provided for cryogenically modifying the microstructure of the insert material from a basically austenitic matrix to at least about 25 Vol.% martensite. The treating apparatus 54 preferably includes an annular tube or distribution manifold 56 having a plurality of radially oriented passages 58 therein distributed around the inner periphery of the tube in equally spaced relation. An inlet conduit 60 is connected to the tube and to a source of a cryogenic medium, for example liquid nitrogen. By peripherally exposing the insert 14 to the jets of liquid nitrogen eminating from the passages 58 the substantially complete austenitic gray iron matrix microstructure can be modified to about 60 Vol.% martensite, for example. This results in a preselected hardness increase and a preselected amount of volumetric expansion.

INDUSTRIAL APPLICABILITY

One method of making the piston assembly 10 includes pouring the aluminum alloy material at about 790° C. (around 1450° F.) into a casting mold, not shown, containing the appropriately positioned austenitic gray iron insert 14. The mold is allowed to cool down to room temperature to provide the piston 12 and insert 14 in intimate association substantially as is illustrated in FIG. 1.

Thereafter, the piston assembly 10 is preferably precooled to a preselected temperature range below freezing, for example to about −60° C. Whereupon the piston assembly 10 is placed within the treating apparatus 54 and liquid nitrogen at −200° C. (−325° F.) is directed into the inlet conduit 60, and around the annular tube 56 where it is forced out the plurality of passages 58 at a pressure of about 170 Kpa (25 psi) to impinge against the exterior surfaces of the insert 14. Preferably, the piston assembly is rotated 90° approximately each 30 seconds relative to the treating apparatus during such cryogenic treatment for a preselected period, for example 2 minutes.

Since a substantial portion of the insert microstructure is changed to martensite from austenite, the hardness increases and the volume thereof increases. For example, in one instance the original austenite form of the insert was modified to about 30 Vol.% martensite and the remainder austenite. This change corresponded to a hardness increase of from about 77 to 98 on the Rockwell "B" scale. In another instance a portion of the insert was modified to about 60 Vol.% martensite with a corresponding hardness value of about 106 on the Rockwell "B" scale. Subsequently, raising of the temperature of the treated insert to that approximating the actual running temperature that such piston assembly would experience in an engine indicated that the modification of the microstructure was stable. Particularly, the insert hardness level readings did not change upon raising the temperature. We concluded from initial experiments that as the volumetric percentage of martensite is increased from about 25 Vol.% toward 100 Vol.% the hardness level of the insert can be expected to increase from about 95 to about 110 on the Rockwell "B" scale. Furthermore, at least about 25 Vol.% martensite is desired in order to obtain a Rockwell "B" scale reading of about 95, and in order to assure an insert hardness level of 100 or more on the Rockwell "B" scale 50 Vol.% or more martensite should be provided. With almost full transformation to martensite a volumetric increase in the order of almost 5% can be expected in a free sample of the insert material; this corresponds to a linear increase of about 1.6% or less.

Figure 2:
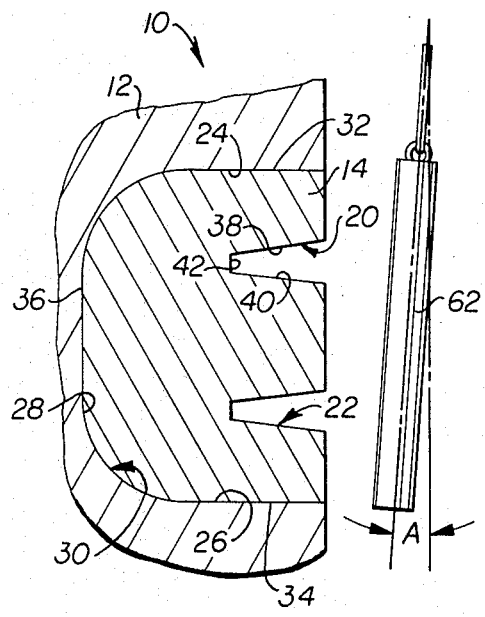
FIG. 2 is an enlarged, diagrammatic, fragmentary cross sectional view of the insert region of the piston assembly of FIG. 1 after cryogenic treatment thereof, showing the attraction of a magnet thereto.

Advantageously, when the microstructure of the insert is changed from basically austenite to a significant portion of martensite the insert becomes magnetic. Hence, as indicated in FIG. 2, a magnetized element or magnet 62 can be suspended radially outwardly of the treated insert and the amount of attraction visually observed or mechanically detected to check that the full periphery of the insert was treated to the same desired degree. Since it is believed that the rate of magnetic attraction is proportional to the volume percentage of martensite and/or to the hardness level, a magnetometer may be provided to obtain a quick and simple reading thereof.

Because of the volumetric expansion of the treated insert it is necessary to thereafter final machine or grind the piston ring grooves 20 and 22 to the desired precise dimension. The particular cross sectional shape of such grooves being incidental to the present invention.

We have also treated the insert 14 in the piston body 12 by impinging a single jet of liquid nitrogen upon the insert. This method only works on a relatively small area at a time, and the piston assembly had to be rotated over a longer period of time.

Furthermore, we have treated an insert by immersing the entire piston assembly in a cryogenic medium or atmosphere. Advantageously, the transformation is not time dependent, for it only takes enough time to get the insert to the desired temperature. Although outwardly satisfactory results were achieved, the immersion method is believed to be less desirable than the preferred impingement method because the thermal shock is greatly reduced and the thermal contraction of the aluminum is minimized.

The applicants have subjected piston assemblies with treated inserts to ultrasonic mapping techniques and have learned that the bond between the adjacent surfaces 24 and 32, 26 and 34, and 28 and 36 is very good. In other words, there are minimal irregularities or areas of disbond observed, so that there is every reason to expect that the integrity of the bond will be retained during the dynamic conditions experienced in an internal combustion engine.

We further contemplate manufacturing the piston body 12 and then mechanically locking by keyway, screw thread or dovetail joint, an insert 14 to the piston body prior to cryogenically hardening and expanding the insert into more positive locked engagement with the piston body.

Other aspects, objects and advantages of this invention can be obtained from a study of the drawings, the disclosure and the appended claims.

What is claimed is:

1. A method of cryogenically hardening an insert (14) in an article (12) comprising:
   Step (a) casting an article (12) at least partly around an insert (14); and
   Step (b) cryogenically hardening and expanding at least a portion of the insert (14) more tightly into engagement with the article (12).

2. The method of claim 1 wherein Step (a) includes casting the article (12) of an aluminum based material and selecting the insert (14) of a ferrous based material having a coefficient of expansion approaching that of aluminum.

3. The method of claim 1 wherein Step (a) includes selecting the material of the article (12) to be basically aluminum and the material of the insert (14) to be a ferrous based material having a basically austenitic matrix microstructure.

4. The method of claim 3 wherein Step (b) includes modifying the microstructure of the insert (14) from a basically austenitic matrix to austenite and at least about 25 Vol.% martensite.

5. The method of claim 1 wherein Step (b) includes changing the microstructure of the insert (14) from a basically austenitic matrix ferrous based material to a matrix morphology having more than 50 Vol.% martensite.

6. The method of claim 1 including the step of precooling the article (12) and the insert (14) to a preselected temperature range below freezing prior to Step (b).

7. The method of claim 1 wherein Step (b) includes spraying the insert (14) with a cryogenic medium for a preselected period of time.

8. The method of claim 1 wherein Step (b) includes spraying the insert (14) with liquified nitrogen.

9. The method of claim 1 including Step (c) checking the hardness level obtained by Step (b) by visual observation of the influence of the insert (14) upon a magnetized element (62).

10. A method of cryogenically hardening a piston ring insert (14) in a piston (12) comprising:
    Step (a) casting a material around the insert (14) and providing an assembly (10) of the piston (12) and the insert (14); and
    Step (b) cryogenically hardening and expanding the insert (14) more tightly into engagement with the piston (12).

11. The method of claim 10 wherein Step (a) includes selecting the material of the insert to be cast iron having a matrix of a substantially austenitic microstructure.

12. The method of claim 11 wherein Step (b) includes modifying the matrix of the insert to at least about 25 Vol.% martensite.

13. The method of claim 10 including Step (c) checking the magnetic attraction of the insert (14) against a corresponding hardness level.

14. In a method of making a piston assembly (10) including a piston (12) and a piston ring insert (14), the improvement comprising:
    casting the piston (12) about the piston ring insert; and
    cryogenically hardening and expanding the insert (14) more tightly into engagement with the piston (12).

15. The method of claim 14 including the step of spraying a cryogenic medium upon the insert (14).

16. The method of claim 15 including the step of simultaneously rotating the piston assembly (10).

* * * * *